United States Patent Office
3,533,880
Patented Oct. 13, 1970

3,533,880
METHOD FOR ADHERING POLYMETHYL
METHACRYLATE TO A SUBSTRATE
Leo J. Windecker, Midland, Tex., assignor to The Dow
Chemical Company, Midland, Mich., a corporation of
Delaware
No Drawing. Filed Sept. 29, 1967, Ser. No. 671,599
Int. Cl. C09j 3/00
U.S. Cl. 156—335                                4 Claims

ABSTRACT OF THE DISCLOSURE

Polymethyl methacrylate is adhered to itself and other substrates by means of a thermosetting particular phenol-formaldehyde resin.

---

This invention relates to a method for adhering polymethyl methacrylate resin onto various substrates and to an article produced thereby, and more particularly relates to adhering polymethyl methacrylate to various substrates by means of a particular phenol-formaldehyde resin.

Polymethyl methacrylate, particularly in its transparent form, is advantageously employed for many purposes including windows, structures such as tanks, containers, mechanical apparatus and the like. Oftentimes, such structures are joined together by means of an adhesive employing a volatile solvent. One particularly desirable adhesive for polymethyl methacrylate is a solution of polymethyl methacrylate in chloroform. Other materials such as epoxy resins are employed. For many applications, it is desirable that adhesive bonding of polymethyl methacrylate to itself or to other materials be accomplished employing an adhesive which sets relatively rapidly, provides a firm bond and contains no solvent which would tend to soften or plasticize the polymethyl methacrylate and give rise to stress cracking. Oftentimes, it is desired to bond polymethyl methacrylate to thermosetting resins, glass fiber reinforced thermosetting resins, aluminum and the like without requiring the use of a solvent type adhesive or a setting adhesive which require extensive cure time.

It would be desirable if there were available an improved method for bonding polymethyl methacrylate to itself or other substrates employing a thermosetting adhesive.

It would also be desirable if there were available an improved polymethyl methacrylate structure having polymethyl methacrylate bonded to a substrate.

These benefits and other advantages in accordance with the method of the present invention are achieved by adhering a body having a surface of polymethyl methacrylate to a substrate by disposing between the substrate and the polymethyl methacrylate body an acid catalyzed phenol-formaldehyde resin prepared by condensing one molecular equivalent of a monohydric phenol which is unsubstituted in at least one of the 2, 4 and 6 positions of the benzene nucleus with between one and 2.5 molecular equivalents of formaldehyde, said condensation occurring in an alkaline medium at a temperature of from about 40 to 70° C., acidifying the reaction mixture by adding a strong aqueous mineral acid at a point where the product is a thin, water-soluble liquid, continuing the reaction at a temperature of between 40 and 70° C. until the mixture becomes viscous and is water-soluble, separating the water-insoluble acidified phenol-formaldehyde condensation product from the reaction mixture, subsequently neutralizing by the addition of an alkali material, washing said condensate with water, and subsequently mixing at least a portion of said condensate with from 1 to 5 percent of an acid catalyst selected from the group consisting of di- chloroacetic acid, trichloroacetic acid, benzene sulphonyl chloride and p-toluene sulphonic acid and mixtures thereof, pressing the polymethyl methacrylate body toward the substrate, maintaining the body and substrate in engagement until the phenol-formaldehyde resin is hardened.

The method of the present invention is readily employed utilizing polymethyl methacrylate either clear, pigmented, in particulate formed foam or solid foam. A wide variety of substrates may also be employed in the practice of the present invention and include glass reinforced epoxy resins and/or solid epoxy resins. Such solid epoxides are known and described in U.S. Letters Patents 2,467,171; 2,538,072; 2,582,985; 2,615,007 and 2,-698,315. Wood, cellulose, graphite, metals such as aluminum, steel and the like may also be employed as substrates.

With regard to the adhesive utilized in the practice of the invention, thermosetting phenol-formaldehyde resins in a water-insoluble liquid state are employed in the practice of the invention. In general, such resins are prepared by condensation of one molecular equivalent of a monohydric phenol, which is unsubstituted in at least one of the 2, 4 and 6 positions of the benzene nucleus with between 1 and 2.5, preferably between 1.40 and 1.50, molecular equivalents of formaldehyde and discontinuing the condensation reaction when the product becomes water-insoluble, but remains liquid. Procedures for making such liquid phenol-formaldehyde condensation products are well known and need not be given in detail. In order to prepare a suitable adhesive composition, usually the condensation reaction is started under alkaline conditions, e.g., using from 1 to 2 percent by weight of sodium hydroxide, potassium hydroxide, sodium carbonate or other alkali as catalyst and carried out at temperatures in the order of from 40° to 70° C. to a point at which the product is a fairly thin, water-soluble liquid. The mixture is acidified by adding a strong aqueous mineral acid such as hydrochloric or sulphuric acid, etc., and continuing the reaction at similar temperatures until the mixture becomes fairly viscous and is water-insoluble. The reaction is preferably stopped short of the solidification point, since the liquid resin is more conveniently used in preparing the panel of the invention than is the solid thermoplastic state of the resin, but the solid state of the resin can be used if dissolved in a suitable solvent. It is essential that the phenol-formaldehyde condensation reaction be carried to a point at which the product is substantially water-insoluble (although said product itself may have from 20 to 35 percent of water dissolved in it) since the water-soluble liquid condensation products formed in the earlier stages of the phenol-formaldehyde condensation reaction usually harden to form porous products when used directly as the adhesive.

After carrying the phenol-formaldehyde condensation reaction out in the presence of an acid to a point at which the product is a water-insoluble liquid, the mixture is neutralized, e.g., with aqueous ammonia, NaOH, KOH, $NA_2CO_3$ or $K_2CO_3$, etc., and washed thoroughly with water. It usually then retains from 20 to 35 percent by weight of dissolved water, but is suitable for direct use in the invention. In most instances, such condensation product of phenol and formaldehyde has a viscosity of from 300 to 400 centipoises at 25° C., but it may be of lower or higher viscosity. If desired, it may be heated, preferably under vacuum, to remove part or all of the water prior to use in the invention.

The liquid, water-insoluble phenol-formaldehyde resin may be treated directly with from 1 to 10 percent by weight of at least one of the catalysts, p-toluene sulphonic acid, dichloroacetic acid, trichloroacetic acid or benzene sulphonyl chloride, based on the anhydrous weight of the resin, to obtain an adhesive composition which hardens rapidly at ordinary or elevated temperatures; that is, temperatures between about 10° C. and 60° C. or above, to form a water permeable product which adheres the polymethyl methacrylate body substrate to the substrate. The adhesive can be applied to the polymethyl methacrylate by any conventional methods, including brushing, dipping or spraying. The bodies to be joined are then subsequently pressed together and maintained in such a position until the adhesive has cured.

The method of the present invention is applied with particular benefit to adhering transparent polymethyl methacrylate sheets to reinforced epoxy resin glass fiber structures to form windows therein. Such sheets of polymethyl methacrylate when installed in a glass fiber reinforced epoxy resin article such as an aircraft body are exceptionally rigid and withstand presure variations within the cabin as well as tortional stresses generated by flexing of the glass reinforced resin structure. When adhered within a suitable recess such as a window opening in an aircraft fuselage, the polymethyl methacrylate sheets radially become a load bearing element and provide added strength to the structure as well as the desired light transmission characteristics.

By way of further illustration, an adhesive is prepared in the following manner: a mixture of 44.5 parts by weight of phenol, 55.5 parts of an aqueous formaldehyde solution of 37 weight percent concentration and 1.5 parts of sodium hydroxide is reacted at 60° C. for 6 hours. At this stage of the reaction, the liquid condensation product is water-soluble. The mixture is then acidified by addition of 33 cc. of aqueous sulphuric acid of 30 percent concentration per pound of the mixture to which the acid is added. The acidified mixture is agitated while warmed to about 40° C. for from 2 to 3 hours. The aqueous and organic layers of the mixture are separated and the organic layer is washed thoroughly with water. The water-insoluble liquid phenol-formaldehyde product thus obtained retains from 20 to 35 percent of water dissolved therein.

An aircraft fuselage is provided, the aircraft fuselage has window openings having flanges thereabout to receive a fitted polymethyl methacrylate window. Each of the flanges is coated with a catalyzed phenolformaldehyde resin and the matching polymethyl methacrylate windows positioned in the openings, the windshield being a curved portion of polymethyl methacrylate sheet ½ inch thick, whereas the side windows are ⅜ inch thick polymethyl methacrylate sheets. The phenolformaldehyde resin is permitted to cure. Subsequent loading of the fuselage indicates superior adhesion to that obtained when employing conventional adhesives for polymethyl methacrylate.

Employing the hereinbefore prepared phenolformaldehyde resin, polymethyl methacrylate bodies are strongly adhered to wood, aluminum, cellulose, reinforced phenolformaldehyde resin and the like.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method of adhering polymethyl methacrylate to a substrate, the steps of the method comprising:

disposing between the substrate and the polymethyl methacrylate body an acid catalyzed phenol-formaldehyde resin prepared by condensing one molecular equivalent of a monohydric phenol which is unsubstituted in at least one of the 2, 4 and 6 positions of the benzene nucleus with between 1 and 2.5 molecular equivalents of formaldehyde, said condensation occurring in an alkaline medium at a temperature of from about 40° to 70° C., acidifying the reaction mixture by adding a strong aqueous mineral acid at a point where the product is a thin, water-soluble liquid, continuing the reaction at a temperature of between 40° and 70° C. until the mixture becomes viscous and is water-insoluble, separating the water-insoluble acidified phenol-formaldehyde condensation product from the reaction mixture, subsequently neutralizing by the addition of an alkali material, washing said condensate with water, and subsequently mixing at least a portion of said condensate with from 1 to 5 percent of an acid catalyst selected from the group consisting of dichloroacetic acid, trichloroacetic acid, benzene sulphonyl chloride and p-toluene sulphonic acid and mixtures thereof, pressing said body toward the substrate, and maintaining said body and substrate in engagement until the phenol-formaldehyde resin is hardened.

2. The method of claim 1 wherein the polymethyl methacrylate is in the form of a transparent sheet.

3. The method of claim 2 wherein the substrate is a reinforced epoxy resin structure.

4. The method of claim 2 wherein the substrate is an aircraft fuselage window opening.

References Cited
UNITED STATES PATENTS

| | | | |
|---|---|---|---|
| 3,006,883 | 10/1961 | Cambron | 156—335 X |
| 3,025,250 | 3/1962 | Herrick et al. | |
| 3,039,981 | 6/1962 | Shannon et al. | 156—335 X |
| 3,108,990 | 10/1963 | Baxter | 156—335 X |
| 3,267,053 | 8/1966 | Nagle et al. | 156—335 X |
| 3,274,139 | 9/1966 | Lambuth | 156—335 X |
| 3,280,217 | 10/1966 | Lader et al. | 156—335 X |
| 3,281,493 | 10/1966 | Thornton et al. | 156—335 X |
| 3,284,392 | 11/1966 | Steinfink | 156—335 X |
| 3,300,426 | 1/1967 | Hunsucker | 156—335 X |
| 3,342,776 | 9/1967 | Lambuth | 156—335 X |

BENJAMIN R. PADGETT, Primary Examiner

S. J. LECHERT, Jr., Assistant Examiner

U.S. Cl. X.R.

161—215, 257, 259, 261